United States Patent [19]

Chen et al.

[11] 4,415,693

[45] Nov. 15, 1983

[54] STABILIZATION OF POLYESTERAMIDES WITH URETHANES

[75] Inventors: Augustin T. Chen, Cheshire; Robert G. Nelb, II; Kemal Onder, both of New Haven, all of Conn.

[73] Assignee: The Upjohn Company, Kalamazoo, Mich.

[21] Appl. No.: 406,126

[22] Filed: Aug. 9, 1982

[51] Int. Cl.$^3$ .......................... C08K 5/20; C08L 77/12
[52] U.S. Cl. ................................... 524/198; 524/199; 525/424
[58] Field of Search ................ 524/198, 199; 525/425, 525/424

[56] References Cited

U.S. PATENT DOCUMENTS

| | | | |
|---|---|---|---|
| 3,272,774 | 9/1966 | Moyer | 528/185 |
| 3,468,975 | 9/1969 | Duxbury et al. | 525/425 |
| 3,849,514 | 11/1974 | Gray et al. | 525/425 |
| 3,896,078 | 7/1975 | Hoeschele | 525/425 |
| 3,904,706 | 9/1975 | Hoeschele | 524/258 |
| 4,129,715 | 12/1978 | Chen et al. | 528/67 |
| 4,182,842 | 1/1980 | Jackson et al. | 528/292 |
| 4,384,083 | 5/1983 | Baker | 525/424 |

*Primary Examiner*—Veronica P. Hoke
*Attorney, Agent, or Firm*—James S. Rose; Denis A. Firth

[57] ABSTRACT

Disclosed are novel compositions comprising blends of at least about 75 percent by weight of a polyesteramide and the balance of the blends comprising a urethane containing ingredient. Optionally, an antioxidant component is present in the blends.

The blends display an unexpected level of stability in regard to their tensile properties when exposed to elevated temperatures.

The blends find particular utility in the area of hoses, gaskets, seals, etc., used in handling fluids at elevated temperatures.

17 Claims, No Drawings

STABILIZATION OF POLYESTERAMIDES WITH URETHANES

BACKGROUND OF THE INVENTION

1. Field of the Invention

This invention relates to polyesteramides and is more particularly concerned with blends comprising polyesteramides and minor amounts of urethane group containing ingredients, and, optionally, antioxidants.

2. Description of the Prior Art

Linear polyesteramides belong to a well known class of polymers which are characterized by the presence of recurring amide and ester linkages in the molecule. By joining polyester groups and polyamide groups through various types of linkages, and, particularly in the form of block copolymers, the beneficial physical properties characteristic of polyamides such as tensile strength, impact strength, toughness, etc. can be realized while at the same time enjoying the benefits of an elastomeric material which latter property is not characteristic of polyamides alone. For a representative group of polyesteramides see those disclosed in U.S. Pat. Nos. 3,272,774; 3,468,975; 3,849,514; 4,129,715 and 4,182,842.

In common with many polymers, polyesteramides can lose mechanical properties upon exposure to elevated temperatures for extended periods of time. This loss is reflected particularly in the lowering of tensile properties, i.e., modulus, tensile strength, and elongation properties. These losses can occur either through high temperature processing (e.g. injection molding or extruding) or during some end-use application (e.g. hydraulic lines carrying fluids at high temperatures).

U.S. Pat. No. 3,904,706 discloses stabilized copolyetherester polymers which contain polyalkylene oxide blocks. The ether blocks, and thus the polymer itself, are stabilized by blending into the polymer the combination of a small amount of a urethane containing compound plus an antioxidant. However, the degree to which the physical properties of the stabilized polyetherester elastomers are maintained under elevated temperature is minimal. In fact, such polymers appear to have a very limited high temperature application capability.

We have now discovered that blending minor amounts of urethane ingredients alone with polyesteramide polymers results in the polyesteramides having enhanced thermal stability which is reflected in the polymers retaining their good tensile properties to a substantial degree when subjected to high temperatures.

Surprisingly, this enhancement in thermal properties, particularly with the additional presence of standard types of antioxidants in the blends of this invention, occurs to a greater extent than is the case for the copolyetherester polymers disclosed in U.S. Pat. No. 3,904,706 cited supra.

Additionally, the blends in accordance with the present invention possess other quite unexpected advantageous features compared to the polyesteramide alone which features will be discussed below.

The improved thermostability enables the present polymers to be utilized in high temperature applications not heretofore possible for polyesteramides.

SUMMARY OF THE INVENTION

This invention comprises compositions which comprise a blend of at least about 75 percent by weight of a polyesteramide and the balance of the blend comprising a urethane containing ingredient.

The term "polyesteramide" means a polymer having recurring amide and ester linkages which are joined by divalent radicals selected from alkylene, arylene, cycloalkylene, blocks derived from polyester polymers, blocks derived from polyamide polymers, and mixtures thereof.

The term "urethane containing ingredient" means a compound containing at least one urethane group (—NHCOO—) including non-polymeric organic compounds containing one or more nitrogen substituted carbamate linkage and polyurethanes containing a recurring carbamate linkage. The preferred urethane ingredients fall into the class of linear polyurethane polymers and most preferably the thermoplastic polyurethanes.

The term "alkylene" means a divalent aliphatic radical having from 1 to 10 carbon atoms, inclusive, such as methylene, ethylene, propylene, butylene, pentylene, hexylene, heptylene, octylene, nonylene, decylene, and isomeric forms thereof.

The term "arylene" means a diradical obtained by removing two nuclear hydrogen atoms from an aromatic hydrocarbon having from 6 to 16 carbon atoms, inclusive. Illustrative of arylene are phenylene, tolylene, xylylene, naphthylene, diphenylylene, and diradicals having the formula

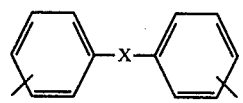

wherein X is selected from the group consisting of a single bond, —SO$_2$—, —CO—, —O—, and straight or branched chain lower alkylene from C$_1$ to C$_4$ such as methylene, ethylene, propylene, butylene and isomeric forms thereof.

The term "cycloalkylene" means a divalent cycloaliphatic radical having from 4 to 8 carbon atoms, inclusive, such as 1,3-cyclobutylene, 1,3-cyclopentylene, 2-methyl-1,3-cyclopentylene, 2-ethyl-1,3-cyclopentylene, 1,4-cyclohexylene, 2-methyl-1,4-cyclohexylene, 1,3-cycloheptylene, 1,4-cycloheptylene, 5-methyl-1,3-cycloheptylene, 1,3-cyclooctylene, 5-methyl-1,3-cyclooctylene, 1,4-cyclooctylene, and the like.

Any of the diradicals joining the ester and amide groups whether they be alkylene, arylene, cycloalkylene, can carry inert substituents. The term "inert substituent" means any group which does not react with any component of the blend and does not otherwise interfere with their preparation. Illustrative of such inert substituents are halo (i.e. chloro, bromo, iodo, fluoro); alkoxy of C$_1$ to C$_8$ such as methoxy, ethoxy, propoxy, butoxy, etc.; cyano; and the like.

The term "blocks derived from polyester polymers" means the residue of a polyester having a molecular weight from about 400 to about 4000 which is obtained by reacting a dicarboxylic acid or mixture of two or more such acids and an excess of a hydrocarbyl alkane diol having 2 to 8 carbon atoms, or mixtures of two or more such diols.

The term "blocks derived from polyamide polymers" means the residue of a polyamide having a molecular weight from about 750 to about 2000.

Preferred compositions according to the invention are those which comprise blends of (1) about 75 to about 98 percent by weight of a thermoplastic polyesteramide having the recurring unit $$-\{BCOOAOOC\}_{\overline{m}}BCO-\{NHRNHCOD-CO\}_{\overline{x}}NHRNHCO-\quad\quad (I)$$

wherein R is selected from the class consisting of arylene of the formulae

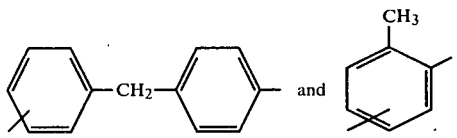

and mixtures thereof, A is the residue of a polymeric polyester diol HO—A—OH having a molecular weight from about 400 to about 4000, B is the residue of a dicarboxylic acid HOOC—B—COOH wherein B is a divalent radical selected from the class consisting of alkylene having 4 to 12 carbon atoms, inclusive, 1,4-phenylene, and 1,3-phenylene, m has a mean value of less than 1 and greater than 0, D is the residue of a dicarboxylic acid HOOC—D—COOH such that the melt temperature of the hard segment is not greater than 280° C., and x is a number having an average value from 0 to 10; and (2) about 2 to about 25 percent by weight of a thermoplastic polyurethane.

The most preferred compositions in accordance with the present invention also comprise an antioxidant.

The present invention compositions are ideally suited for various molding techniques (injection, blow, compression, and the like) to produce the articles normally produced from polyesteramides such as bushings, seal faces, compressor vanes, impellers, pistons and piston rings, gears, thread guides, cams, brake linings, clutch faces, abrasive articles, but additionally to produce elastomers for use in those applications calling for even higher heat resistance as noted above such as wire coating, hoses, gaskets, seals, and the like, used in handling and pumping high temperature hydraulic fluids.

DETAILED DESCRIPTION OF THE INVENTION

Generally speaking, the blend compositions in accordance with the present invention comprise about 75 percent to about 98 percent by weight of polyesteramide and have the balance of 2 to 25 percent by weight made up of the urethane ingredient. However, this is not to say that minor proportions of additional components cannot be present so long as the polyesteramide and urethane fall within the weight percent ranges set forth above and so long as the presence of any additional component does not interfere with the enhanced thermal stability of the present compositions.

Preferably, the blends contain about 85 to about 96 percent by weight of a polyesteramide and about 4 to about 15 percent by weight of a urethane ingredient. Most preferably, the polyesteramide is employed in amounts from about 90 to about 96 percent by weight with the urethane being 4 to 10 percent by weight.

The polyesteramides defined above which can be employed in the present blends can be any of the polyesteramide polymers known to those skilled in the art. Generally speaking, the polymers are linear in nature, and, in order to obtain the maximum benefits in accordance with the present invention, the preferred polyesteramides to be used are elastomeric.

The polyesteramides are readily obtained by copolymerizing (1) an amide constituent consisting of a polyamide or a polyamide-forming component or a mixture of polyamide-forming components with (2) an ester constituent consisting of a polyester or a polyester-forming component or mixture of polyester-forming components. For typical polyesteramides which can be employed in the present blends see U.S. Pat. Nos. 3,272,774; 3,468,975; 3,849,514; 4,129,715 and 4,182,842, whose disclosures are incorporated herein by reference.

Preferred amongst the polyesteramides are those disclosed in U.S. Pat. No. 4,129,715 cited supra containing a polyester block and defined in formula (I) above.

The preparation of these preferred polyesteramides is readily accomplished using the methods disclosed in U.S. Pat. No. 4,129,715. Briefly, a polyester diol HO—A—OH, having the MW range set forth above and wherein A is as above defined, is first prepared by reacting a dicarboxylic acid such as adipic, suberic, azelaic, glutaric, terephthalic, and mixtures thereof, with an excess of a dihydric alcohol such as ethylene glycol, propylene glycol, 1,4-butanediol, and the like.

A preferred MW range for the base polyester diol is from about 800 to about 2000.

The polymeric diol is then converted to a carboxylic acid-terminated polyester prepolymer by reaction with excess dicarboxylic acid HOOC—B—COOH, wherein B is as above defined, such as adipic, pimelic, suberic, azelaic, sebacic, 1,11-undecanedioic, 1,12-dodecanedioic, 1,13-tridecanedioic, 1,14-tetradecanedioic, α-methyladipic, α,α-dimethylazelaic, isophthalic, terephthalic acid and 2-chloro-1,4-terephthalic acids, and the like.

Preferred amongst the acids HOOC—B—COOH are the aliphatic dicarboxylic acids exemplified above and mixtures thereof. Particularly preferred are equimolar mixtures of adipic and azelaic acids.

The acid terminated prepolymer so obtained is reacted in stoichiometric proportions with a diisocyanate selected from 4,4'-methylenebis(phenyl isocyanate), 2,4'-methylenebis(phenyl isocyanate), 2,4-toluene diisocyanate, 2,6-toluene diisocyanate, and the like. A preferred group of diisocyanates comprises 4,4'-methylenebis(phenylisocyanate) alone or in admixture with up to 50 percent by weight of 2,4-toluene diisocyanate.

In the event that x in formula (I) above has an average value of greater than 0 there is included in the reaction mixture, in addition to the carboxylic acid-terminated prepolymer and diisocyanate, at least one other dicarboxylic acid HOOC—D—COOH or mixture of such dicarboxylic acids. In order to achieve a hard segment melt temperature not greater than 280° C. (as defined in U.S. Pat. No. 4,129,715) the additional diacid component is a straight chain dicarboxylic acid having a total of from 6 to 14 carbon atoms. Preferred are azelaic and adipic acids as well as equimolar mixtures thereof.

The urethane containing ingredients employed in the blends of the invention are the non-polymeric compounds or polyurethanes defined above. The means used for preparing the urethane ingredients has no effect on their efficacy but, generally speaking, they are obtained via the reactions of the appropriate isocyanate bearing compounds with hydroxyl compounds.

As noted above, the urethane containing ingredients contain at least one urethane linkage (—NHCOO—). The other radicals which satisfy the valences on the nitrogen and oxygen atoms are not critical so long as they are inert to the polyesteramide and any other ingredient which may be present.

Illustrative, but not limiting, of the non-polymeric compounds are the urethanes arising from the reactions of typical monoisocyanates such as phenyl-, butyl-, p-tolylisocyanates with typical alcohols such as ethanol, butanol, hexanol, and the like. Also the urethane ingredients can be those compounds arising from the reactions of polyisocyanates with monoalcohols in stoichiometric proportions, or, conversely, from the reactions of polyols with monoisocyanates. Typical combinations include the urethanes obtained from 2,4-, and 2,6-toluene diisocyanate, or mixtures thereof, 4,4'-methylenebis(phenyl isocyanate), 2,6-naphthalene diisocyanate, polymethylene polyphenylisocyanate, 1,6-hexane diisocyanate, 1,4-cyclohexane diisocyanate, and the like reacted with methanol, ethanol, butanol, and the like; and, conversely, the urethanes obtained from ethylene glycol, propylene glycol, butylene glycol, dipropylene glycol, 1,4-butanediol, glycerine, trimethylolpropane, and the like reacted with phenyl isocyanate, butyl isocyanate, and the like monoisocyanates.

In a preferred embodiment of the present invention, the urethane compounds are linear polyurethane polymers and in a most preferred embodiment they are thermoplastic polyurethane polymers.

The thermoplastic polyurethanes can be either the polyether-based or polyester-based polyurethanes which are well known and widely used by those skilled in the art. For typical disclosures relating to these polymers and for methods for their preparation see U.S. Pat. Nos. 3,493,634; 3,642,964; 4,169,196 and 4,202,957 whose disclosures are incorporated herein by reference.

Preferred are the polyester based thermoplastic polyurethanes.

Although not absolutely essential, it is preferable that the blends in accordance with the present invention contain an antioxidant. The type and amount of antioxidant is in no way critical to the present invention. The various types of antioxidants, and their proportions for use in conjunction with polymers, are well known to those skilled in the art.

Generally speaking, the antioxidant can be used in the proportions of from about 0.1 to about 5 percent by weight based on the combined weight of polyesteramide and urethane, and preferably from about 0.5 to about 3 percent by weight.

Typical classes of antioxidants include arylamines and hindered phenols. Included in the first class but not limiting thereof are such compounds as N-phenylnaphthylamine, 4,4'-dimethoxydiphenylamine, N,N'-di-$\beta$-naphthyl-p-phenylenediamine, and the like.

Preferred as a class are the hindered phenols, which, illustratively but not limiting thereof, include 2,6-di-t-butyl-4-methylphenol, butylated p-phenylphenol, 2-($\alpha$-methylcyclohexyl)-4,6-dimethylphenol, 2,2'-methylenebis(6-t-butyl-4-methylphenol), 4,4'-methylenebis(2,6-di-t-butylphenol), 4,4'-methylenebis(6-t-butyl-2-methylphenol), 1,3,5-tris(3,5-di-t-butyl-4-hydroxyhydrocinnamoyl)-hexahydro-5-triazine, tetrakis[methylene-3-(3',5'-di-t-butyl-4'-hydroxyphenyl)propionate]methane, thiodiethylenebis(3,5-di-t-butyl-4-hydroxyhydrocinnamate), octadecyl 3-(3',5',-di-t-butyl-4-hydroxyphenyl)propionate, N,N'-hexamethylenebis(3,5-di-t-butyl-4-hydroxyhydrocinnamamide).

The preferred species of phenol is the last one set forth above.

The blends in accordance with the present invention are readily prepared in any sequence desired either by dry-blending, or, alternatively, fluxing the ingredients together in the case of thermoplastic components. If an antioxidant is to be employed it can be added in any fashion, either first to the polyesteramide, or to the urethane component. Either component may be available commercially with an antioxidant already mixed in, in which case, it only remains to blend in the other component. Alternatively, the antioxidant can be mixed in at the same time the two main ingredients are being mixed.

Dry-blending can be carried out using any convenient means such as a barrel mixer, a tumble mixer, a Henschel mixer, and the like.

Optionally, the polyesteramide and urethane (and antioxidant if not already present in one of the other components) are fluxed in any suitable mixing apparatus such as a Banbury type internal mixer, rubber mill, extruder, and the like, at a temperature of from about 200° C. to about 280° C. to form a homogeneous blend.

If desired, the blends of the invention can have incorporated in them other additives such as pigments, fillers, lubricants, stabilizers, coloring agents, and the like.

In addition to the enhanced tensile properties discussed above, the present blends are characterized by improved compression set values after being exposed to elevated temperatures. This feature makes the blends particularly useful in the applications calling for gaskets and seals with improved resistance to liquids at higher than normal temperatures.

The following preparations and examples describe the manner and process of making and using the invention and set forth the best mode contemplated by the inventors of carrying out the invention but are not to be construed as limiting.

Preparation of Polyesteramide A

Polyesteramide A was prepared according to the methods described in U.S. Pat. No. 4,129,715 and had a recurring unit of the formula:

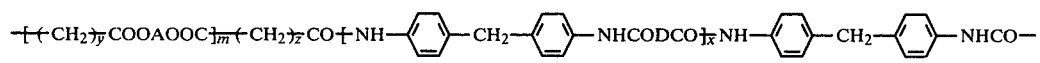

wherein A is the residue of a 1000 MW poly(tetramethylene azelate)glycol, m has an average value of 0.74, y and z each simultaneously or separately represent 4 or 7, D in 50 percent of the recurring units in the molecule is —(CH$_2$)$_4$ and in the remaining 50 percent is —(CH$_2$)$_7$, and x has an average value of 2. The inherent viscosity (0.5 g./100 ml. in NMP [N-methylpyrrolidone] at 30° C.) was 1.25 dl/g.

Preparation of Polyesteramide B

Polyesteramide B was prepared according to the methods described in the patent cited supra and had the recurring unit of the formula:

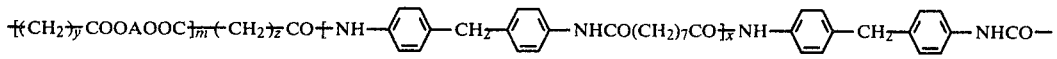

wherein A, m, y, and z have the same significance defined in Polyesteramide A above, and x has an average value of about 1.2. The inherent viscosity (0.5 g./100 ml. in NMP at 30° C.) was 0.98 dl/g.

Preparation of Polyesteramide C

Polyesteramide C was prepared according to the methods described in the patent cited supra and had the recurring unit of the formula:

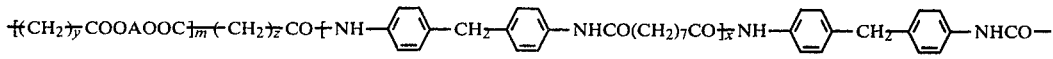

wherein A is the residue of a 1000 MW poly(hexamethylene)adipate glycol, m has an average value of 0.74, y and z each simultaneously or separately represent 4 or 7, and x has an average value of 1.2. The inherent viscosity (0.5 g./100 ml. in NMP at 30° C.) was 1.23 dl/g.

EXAMPLE 1

A blend A in accordance with the present invention was prepared by blending together 1500 g. of Polyesteramide A in powder form with 75 g. (5% level) of a thermoplastic polyurethane powder derived from the reaction of about 1 equivalent of a polycaprolactone diol of 2000 MW, about 7 equivalents of 1,4-butanediol, and 4,4'-methylenebis(phenyl isocyanate) at an isocyanate to hydroxyl index of about 1, and about 1 percent by weight of the antioxidant N,N'-hexamethylenebis(3,5-di-t-butyl-4-hydroxyhydrocinnamamide) [supplied by Ciba Geigy under the tradename Irganox 1098]. The blending was carried out in a Porta Shell Mixer (Patterson Industries, East Liverpool, Ohio) simply by mixing for a period of about 10 minutes.

The blend was extruded as strands (¼") using a Brabender extruder fitted with a screw of L/D ratio of 25:1 and having a compression ratio of 2:1. The temperature settings in the various zones were all 245° C. The extruded strands were then chopped, redried and then injection molded into sheets (4 13/16×4 13/16×1/16") at 250° C. to yield clear yellow pieces. The sheets were annealed at 200° C. for 3 hours, then they were cured by standing at room temperature for at least 24 hours.

Molded sheets of a comparison composition B were prepared using the ingredients and procedure outlined above except that the polyurethane ingredient was not included but the 1% antioxidant was.

One set of the cured molded sheets from each of A and B were subjected to various tensile tests (in accordance with ASTM D412) under the three test temperatures outlined in Table I (room temperature is taken to be 20° C.). A second set of the sheets was aged at 150° C. under dry heat conditions for 120 hours and then subjected to the same physical tests as set forth in Table I.

The "not-aged" results show the similarity (within experimental error) in physical property values for A and B over the entire temperature range of testing. It is after the samples have been aged under the specified dry heat conditions that the critical differences between A and B can be observed, particularly at the test temperatures of 100° C. and 150° C.

A comparison of the 300% moduli, tensile strengths and elongations between A and B shows clearly the superiority of the former material. In regard to tensile and elongation values blend A is superior over most of the range of temperatures tested. The fact that B, when tested at 100° C., shows a recovery of elongation back to 330 percent compared to 260 percent at 20° C., with the measurable 300 percent modulus of 1750 psi, may be due to either sample softening or sample orientation. However, at the higher test temperature of 150° C. the sample has lost its integrity.

The data shown in the brackets in Table I were determined by subjecting samples of blend A in which the antioxidant was deleted with everything else remaining the same, to the dry heat coditions set forth above. The deletion of the antioxidant did not detract to any degree from the enhanced thermal stability of the blend of Polyesteramide A and the polyurethane.

TABLE I

| | Blend A | | | | | | Comparison Composition B | | | | | |
|---|---|---|---|---|---|---|---|---|---|---|---|---|
| | Not Aged | | | Aged | | | Not Aged | | | Aged | | |
| | 20° C. | 100° C. | 150° C. | 20° C. | 100° C. | 150° C. | 20° C. | 100° C. | 150° C. | 20° C. | 100° C. | 150° C. |
| Physical Properties: Tensile modulus (psi) | | | | | | | | | | | | |
| 50% | 2170 | 925 | 470 | 2360 (2500) | 1000 (1030) | 635 (630) | 2035 | 890 | 465 | 2450 | 815 | 525 |
| 100% | 2595 | 1070 | 500 | 2910 (3035) | 1160 (1215) | 660 (670) | 2440 | 1030 | 500 | 3100 | 1065 | 580 |
| 300% | 4345 | 1510 | 670 | 5075 (4970) | 1630 (1655) | 860 (845) | 4000 | 1440 | 655 | —* | 1750 | —* |
| Tensile str. (psi) | 4640 | 2450 | 815 | 5470 (5300) | 3260 (2885) | 1405 (1250) | 4440 | 2170 | 670 | 5065 | 1960 | 600 |
| Elongation (%) | 335 | 590 | 350 | 340 (336) | 565 (562) | 600 (572) | 357 | 556 | 330 | 260 | 330 | 130 |

*300% modulus values unobtainable due to loss of sample integrity.

EXAMPLE 2

Two blended samples were prepared using the procedure and proportions by weight set forth in Example 1 and using Polyesteramide B instead of Polyesteramide A. Blend C in accordance with the present invention contained 5 percent by weight of the same polyurethane described in Example 1 with a 1 percent by weight concentration of the Irganox 1098. Comparison composition D contained only the 1 percent of antioxidant.

A 58 g. sample of each one of C and D was subjected to a thermal stability study by being subjected to the high shearing forces in a Brabender mixing chamber under the conditions of 250° C. for a first period of 10 minutes. During this period the mixer r.p.m. was increased from 40 to 240 r.p.m. by 40 r.p.m. increments every 2 minutes. Then a second period of 5 minutes followed during which the speed was reduced to 40 r.p.m.

The two treated samples, along with another untreated sample of composition D, were then compression molded into test sheets and subjected to the tensile tests at ambient conditions (20° C.) set forth in Table II. Another set of blend C and composition D, prepared from the same ingredients and proportions set forth above but different batch preparations, were injection molded into sheets and subjected to the compression set tests at 70° C. set forth in Table II.

The high temperature compression set value for C was almost 20 percent better than for D. More noteworthy was the superior elongation of treated C over treated D. Because polymer tensile set is generally directly proportional to elongation, C with the higher elongation over D was characterized by a higher tensile set value. The 300 percent modulus of treated composition D could not be determined because of the sample breakage at 280 percent.

TABLE II

| Physical properties: | Blend C treated | Comparison Composition D untreated | Comparison Composition D treated |
|---|---|---|---|
| Tensile modulus (psi) | | | |
| 50% | 1850 | 1945 | 1910 |
| 100% | 1950 | 2250 | 2000 |
| 300% | 2230 | 3445 | — |
| Tensile str. (psi) | 2355 | 4130 | 2150 |
| Elongation (%) | 390 | 385 | 280 |
| Tensile set (%) | 100 | 30 | 85 |
| Compression set[1] (%) | 51.8 | — | 61.9 |

[1]Compression set was determined in accordance with ASTM D395 at a test temperature of 70° C.

EXAMPLE 3

A blend E in accordance with the present invention was prepared by tumbling together Polyesteramide C already containing 1 percent by weight of Irganox 1098 with 5 percent by weight of the same polyurethane described in Example 1. The mixture was extruded as strands using a Brabender extruder at a 240° C. melt temperature into a water bath. The strands were chopped into pellets and dried. A comparison composition F contained only the 1 percent of antioxidant with the Polyesteramide C.

Samples of E and F were injection molded into sheets and samples subjected to long term dry heat aging at 175° C. At the intervals (in days) noted in Table III, samples of E and F were subjected to the tensile tests at ambient temperature (68° F.) set forth in the table.

The test data shows clearly the greater deterioration in the F series compared with the E series.

After 60 days of exposure the tensile testing methods were not practical as a means of comparing blend E with composition F because of the loss in elongation in both series.

The aging tests were continued by storing the test samples at 180° C. and sample integrity was determined by manually flexing the cooled (stored at ambient temperature for about 10 minutes) dumbbell shaped pieces cut from the sheets (about 60 mil thick), first in one direction so that the ends of the dumbbell touched each other (180 degree bend flexibility), then bending in the opposite direction until the ends touched. A sample passed if it more or less returned to its original flat configuration without cracking or splitting at the bend site. Following are the pass/fail results for the E and F series.

| Days | Sample | Result |
|---|---|---|
| 75 | E | Pass |
|  | F | Fail |
| 88 | E | Pass |
| 98 | E | Pass |
| 117 | E | Pass |
| 125 | E | Fail |

The comparison F did not pass at 75 days exposure whereas E lasted until 125 days into the test.

TABLE III

| | 5 days | | 12 days | | 20 days | | 29 days | | 45 days | | 60 days | |
|---|---|---|---|---|---|---|---|---|---|---|---|---|
| | E | F | E | F | E | F | E | F | E | F | E | F |
| Physical properties: | | | | | | | | | | | | |
| Tensile modulus (psi) | | | | | | | | | | | | |
| 50% | 1000 | 1190 | 1235 | 1290 | 1575 | 1350 | 1900 | 1910 | 2950 | — | 3100 | — |
| 100% | 1670 | 1700 | 1850 | 1900 | 1920 | 2235 | 3110 | — | — | — | — | — |
| 300% | 2600 | 3000 | — | — | — | — | — | — | — | — | — | — |
| Tensile str. (psi) | 3040 | 3140 | 3060 | 2160 | 2250 | 2235 | 3245 | 2240 | 3300 | 2870 | 3100 | 3100 |
| Elongation (%) | 340 | 300 | 200 | 120 | 170 | 100 | 130 | 60 | 60 | 30 | 50 | 30 |
| Tensile set (%) | 22 | 22 | 12 | 12 | 12 | 17 | 10 | 15 | 5 | 8 | 5 | — |

EXAMPLE 4

A blended sample G in accordance with the invention was prepared using the procedure and the same ingredients as those set forth in Example 3 except that the polyurethane level was 2.5 percent of the esteramide/urethane mixture.

The blend was compression molded into sheets and samples of the sheets were subjected to the long term heat aging at 175° C. Samples were tested at the same time intervals described in Example 3 for their respective tensile properties and the data is recorded below in Table IV.

The thermal stability of blend G was superior to that of comparison composition F as evidenced by the comparison of the tensile properties set forth in Table IV with those of F in Table III, particularly in regard to elongation properties even though the two materials differed only by the 2.5 percent polyurethane in G.

TABLE IV

|  | 5 days | 12 days | 20 days | 29 days | 45 days | 60 days |
|---|---|---|---|---|---|---|
| Physical properties: |  |  |  |  |  |  |
| Tensile modulus (psi) |  |  |  |  |  |  |
| 50% | 1060 | 1100 | 1520 | 1785 | 2900 | — |
| 100% | 1680 | 1670 | 2245 | 2910 | — | — |
| 300% | 3310 | — | — | — | — | — |
| Tensile str. (psi) | 3595 | 3125 | 2445 | 3115 | 3180 | 3080 |
| Elongation (%) | 320 | 200 | 120 | 110 | 60 | 30 |

EXAMPLE 5

A blended sample H in accordance with the present invention was prepared using the procedure and ingredients in the proportions by weight set forth in Example 2 except no antioxidant was employed. The blend consisted of the Polyesteramide B and polyurethane at the 5 percent by weight level. A comparison sample I consisted solely of the Polyesteramide B and was not in accordance with the present invention.

Samples of the compressed sheets of H and I were aged by storage at 170° C. for 120 hours and then subjected to the tensile tests at the respective temperatures set forth in Table V. The superior stability of blend H over that of sample I is clearly evident when the test data for aged blend H at the 150° C. test temperature is compared to the aged sample I at the comparative test temperature. Even at the lower test temperatures blend H shows a decided superiority over sample I.

When the test temperature was raised to 200° C., aged blend H has a measurable 50% tensile modulus at 520 psi with a tensile strength of 560 psi and 75 percent elongation. Comparatively, sample I had a tensile strength of 340 psi and elongation of 35 percent.

CO─┤ wherein R is selected from the class consisting of arylene of the formulae

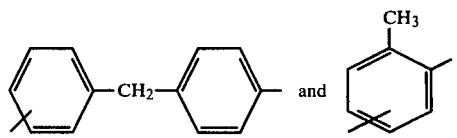

and mixtures thereof, A is the residue of a polymeric polyster diol HO—A—OH having a molecular weight from about 400 to about 4000, which diol is derived from a dicarboxylic acid or mixture of two or more such acids and an excess of hydrocarbyl alkane diol having 2 to 8 carbon atoms, or mixtures of two or more of the latter diols, B is the residue of a dicarboxylic acid HOOC—B—COOH wherein B is a divalent radical selected from the class consisting of alkylene having 4 to 12 carbon atoms, inclusive, 1,4-phenylene, and 1,3-phenylene, m has a mean value of less than 1 and greater than O, D is the residue of a dicarboxylic acid HOOC—D—COOH such that the melt temperature of the hard segment is not greater than 280° C., and x is a number having an average value from zero to 10; and (2) about 2 to about 25 percent by weight of a thermoplastic polyurethane.

5. A composition according to claim 4 also comprising an antioxidant.

6. A composition according to claim 4 wherein R represents

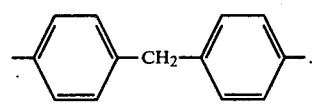

TABLE V

|  | Blend H | | | | | | Comparison Sample I | | | | | |
|---|---|---|---|---|---|---|---|---|---|---|---|---|
|  | Not Aged | | | Aged | | | Not Aged | | | Aged | | |
|  | 20° C. | 100° C. | 150° C. | 20° C. | 100° C. | 150° C. | 20° C. | 100° C. | 150° C. | 20° C. | 100° C. | 150° C. |
| Physical Properties: | | | | | | | | | | | | |
| Tensile modulus (psi) | | | | | | | | | | | | |
| 50% | 1735 | 1360 | 1080 | 1945 | 1450 | 1255 | 1755 | 1245 | 1065 | 1990 | 1310 | 1145 |
| 100% | 1980 | 1650 | 1125 | 2335 | 1735 | 1480 | 2020 | 1440 | 1145 | 2410 | 1610 | — |
| 300% | 3785 | 2275 | — | 3970 | 2270 | — | 3775 | 1980 | — | — | — | — |
| Tensile str. (psi) | 5205 | 2495 | 1315 | 4635 | 2291 | 1560 | 4280 | 2080 | 1295 | 3420 | 1955 | 1280 |
| Elongation (%) | 410 | 360 | 230 | 350 | 315 | 120 | 350 | 320 | 210 | 275 | 210 | 80 |

We claim:

1. A composition comprising a blend of at least about 75 percent by weight of a polyesteramide having recurring amide and ester linkages which are joined by divalent radicals selected from the group consisting of alkylene, arylene, cycloalkylene, blocks derived from polyester polymers which in turn are derived from a dicarboxylic acid or mixture of two or more such acids and an excess of a hydrocarbyl alkane diol having 2 to 8 carbon atoms or mixtures of two or more such diols, blocks derived from polyamide polymers, and mixtures thereof and the balance of the blend comprising a urethane containing ingredient.

2. A composition according to claim 1 also comprising an antioxidant.

3. A composition according to claim 1 wherein said urethane ingredient is a polyurethane.

4. A composition comprising a blend of (1) about 75 to about 98 percent by weight of a thermoplastic polyesteramide having the recurring unit ─[B-COOAOOC]$_{\overline{m}}$ BCO─[NHRNHCODCO]NHRNH- 7. A composition according to claim 4 wherein A is the residue of a poly(hexamethylene adipate)glycol of about MW 1000.

8. A composition according to claim 4 wherein B is alkylene having from 4 to 12 carbon atoms, inclusive.

9. A composition according to claim 4 wherein B is the residue arising from a mixture of approximately equimolar amounts of azelaic and adipic acids.

10. A composition according to claim 4 wherein D is the residue of adipic acid, azelaic acid, or an equimolar mixture thereof.

11. A composition according to claim 4 wherein said blend comprises
   (1) about 90 to about 96 percent by weight of said thermoplastic polyesteramide and
   (2) about 10 to about 4 percent of said thermoplastic polyurethane.

12. A composition according to claim 4 wherein said thermoplastic polyurethane is a polyester polyurethane.

13. A composition according to claim 4 comprising a blend of
(1) about 90 to about 96 percent by weight of the thermoplastic polyesteramide wherein A is the residue of a 1000 MW poly(hexamethylene adipate)glycol, B is the residue of an approximately equimolar mixture of azelaic and adipic acids, D is the residue of azelaic acid, x has an average value of about 1.2, and R represents

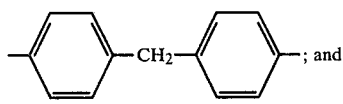

(2) about 10 to about 4 percent by weight of a thermoplastic polyester polyurethane; and
(3) a hindered phenol antioxidant.

14. A composition according to claim 4 comprising a blend of
(1) about 90 to about 96 percent by weight of the thermoplastic polyesteramide wherein A is the residue of a 1000 MW poly(tetramethylene azelate)glycol, B is the residue of an approximately equimolar mixture of azelaic and adipic acids, D is the residue of azelaic acid, x has an average value of about 1.2, and R represents

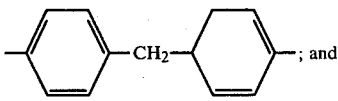

(2) about 10 to about 4 percent by weight of a thermoplastic polyester polyurethane; and
(3) a hindered phenol antioxidant.

15. A composition according to claim 4 comprising a blend of
(1) about 90 to about 96 percent by weight of the thermoplastic polyesteramide wherein A is the residue of a 1000 MW poly(tetramethylene azelate)glycol, B is the residue of an approximately equimolar mixture of azelaic and adipic acids, D is the residue of an approximately equimolar mixture of azelaic and adipic acids, x has an average value of about 1.2, and R represents

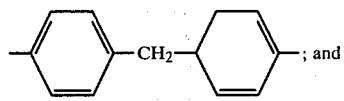

(2) about 10 to about 4 percent by weight of a thermoplastic polyester polyurethane; and
(3) a hindered phenol antioxidant.

16. A composition according to any one of claims 13, 14, or 15 wherein said polyester polyurethane is based on a polycaprolactone glycol, 1,4-butanediol, and 4,4'-methylenebis(phenyl isocyanate).

17. A composition according to any one of claims 13, 14, or 15 wherein said antioxidant is N,N'-hexamethylenebis(3,5-di-tert-butyl-4-hydroxy-hydrocinnamamide).

* * * * *

UNITED STATES PATENT OFFICE
CERTIFICATE OF CORRECTION

Patent No. 4,415,693    Dated November 15, 1983

Inventor(s) Augustin T. Chen, Robert G. Nelb II, Kemal Onder

It is certified that error appears in the above-identified patent and that said Letters Patent are hereby corrected as shown below:

Column 6, line 61 "$-CH_2)_7$" should read -- $-(CH_2)_7-$ --.
Column 11, line 68 to column 12, line 1, claim 4, that portion of the formula reading "$]NHRNHCO\}-$" should read -- $\}_{\overline{x}}$ NHRNHCO- --.

Signed and Sealed this

Tenth Day of April 1984

[SEAL]

Attest:

GERALD J. MOSSINGHOFF

Attesting Officer    Commissioner of Patents and Trademarks